Jan. 22, 1957     R. C. HELKE     2,778,462
FLUID MOTOR AND TRANSMISSION
Filed Aug. 27, 1952
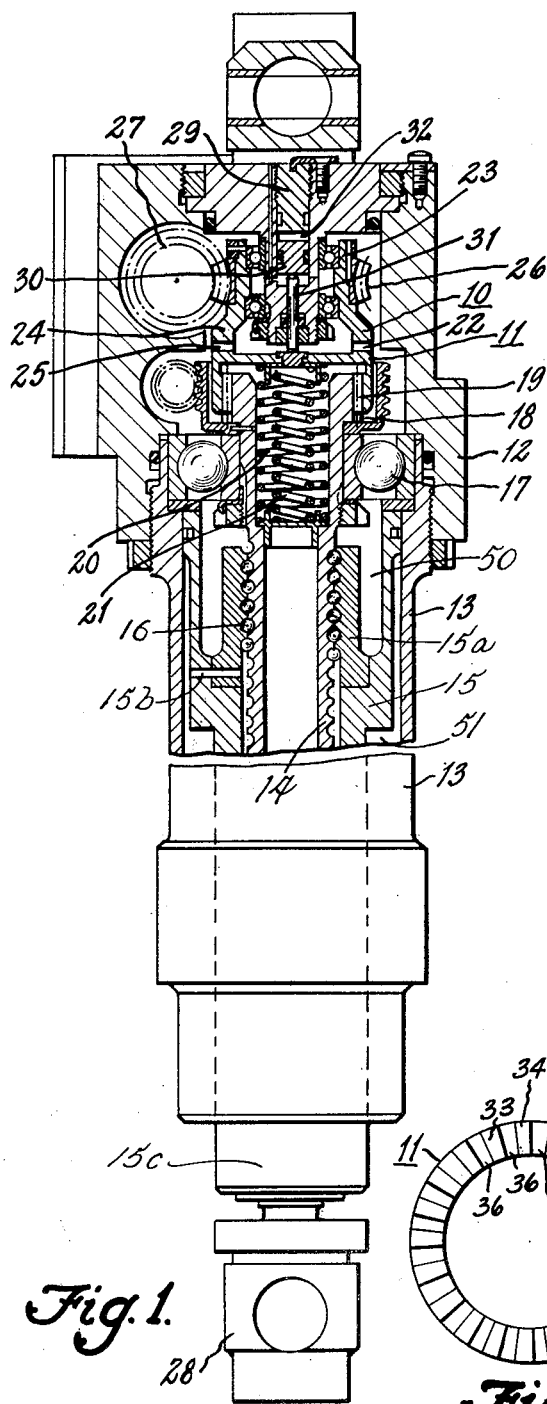
Fig. 1.
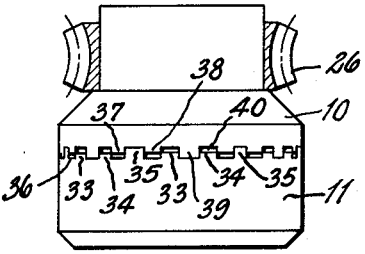
Fig. 2.
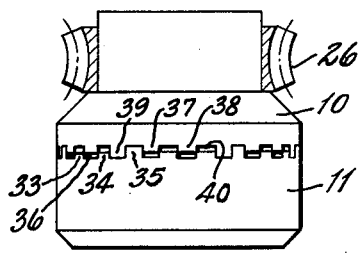
Fig. 3.
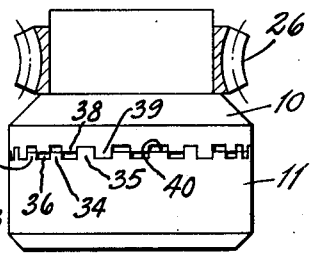
Fig. 4.
Fig. 5.
INVENTOR.
ROBERT C. HELKE
BY Willkie, Hardman and Feller
his ATTORNEYS __United States Patent Office__

2,778,462
Patented Jan. 22, 1957

2,778,462

FLUID MOTOR AND TRANSMISSION

Robert C. Helke, Dayton, Ohio, assignor to General Motors Corporation, Detroit, Mich., a corporation of Delaware Application August 27, 1952, Serial No. 306,614

2 Claims. (Cl. 192—.03)

The present invention relates to couplings, and more particularly to an improved coupling of the type employing dog teeth suitable for use as a clutch or brake.

Heretofore in actuators of the type having a reciprocable piston which threadedly engages a screw shaft to thereby impart rotary movement of the shaft upon reciprocal movement of the piston, difficulty has been encountered with the use of conventional dog tooth type couplings for locking the actuator in a predetermined position. To facilitate engagement between a dog tooth type coupling comprising a stationary toothed member and an axially and rotatably movable toothed member, conventional coupling assemblies employ the expedient of rounding off or beveling the tip portions of the teeth to facilitate engagement therebetween. However, this expedient oftentimes results in undesirable ratcheting or indexing between the relatively movable toothed members during engagement thereof, and, moreover, does not lend itself to the establishment of positive lock therebetween. Accordingly, one of my objects is to provide a dog toothed type coupling wherein positive engagement between the two relatively movable members is assured within a relatively small arcuate distance, and yet substantially eliminates backlash and ratcheting therebetween.

The aforementioned and other objects are accomplished in the present invention by providing a dog toothed type coupling wherein engagement between the two relatively movable members is effected within the arcuate distance of at least three teeth. In addition the configuration of the teeth is such that backlash is substantially eliminated and camming action resultant in ratcheting between the two members is precluded. Specifically, each coupling member is formed with a face perpendicular to its axis upon which a plurality of radially arranged teeth project axially. Each tooth is of equal arcuate size but some of the teeth are of less axial extent than others. The tooth edges are formed at substantially right angles to preclude camming action occurring between the sets of teeth on each member. The teeth on each member are separated by slots, the bottoms of which lie in a common plane spaced from but parallel to the planes of the tooth ends. The teeth of maximum axial extent are separated by slots and a pair of teeth of substantially one-half the axial extent thereof. The teeth of reduced axial extent facilitate engagement between the coupling members within a maximum relative arcuate movement therebetween of three teeth. Backlash is reduced to a minimum by retaining the clearance between coengaging teeth and slots of the members at a minimum.

Further objects and advantages of the present invention will be apparent from the following description, reference being had to the accompanying drawing wherein a preferred embodiment of the present invention is clearly shown.

In the drawing:

Fig. 1 is a fragmentary view partly in section and partly in elevation of an acuator equipped with a coupling constructed according to the present invention, the coupling serving as a brake.

Figs. 2, 3 and 4 are views in elevation illustrating three possible positions of the members wherein positive engagement therebetween may be effected.

Fig. 5 is an end view of one of the coupling members.

The coupling of the instant invention is exemplified in conjunction with an actuator only by way of example. Referring particularly to Fig. 1, the coupling is shown as including a relatively stationary member 10 and an axially and rotatably movable member 11. The members 10 and 11 are enclosed by an actuator tail cap 12, the actuator being generally of the type disclosed and claimed in copending application, Serial No. 247,737, filed September 21, 1951, now Patent No. 2,620,683, issued December 9, 1952, in the name of Howard M. Geyer. For the purpose of the present invention, it will suffice to say that the actuator includes a cylinder 13 enclosing a rotatable screw shaft 14 and a reciprocable piston 15, capable of fluid pressure actuation in either direction. The piston 15 divides the cylinder 13 into an extend chamber 50 and a retract chamber 51. In addition, the piston 15 has connected thereto a nut 15a by means of a pin 15b, the nut engaging the screw shaft 14 through the agency of a plurality of circulating balls 16. Accordingly, reciprocation of the piston 15 is dependent upon and effects rotation of the screw shaft 14. As shown in Fig. 1, the piston 15 includes an integral axially extending rod portion 15c which extends outside of the cylinder 13 and is connected to a clevis 28. The screw shaft 14 is rotatably journaled within the tail cap 12 by bearing means 17. One end of the screw shaft 14 is provided with a straight splined surface 18, which engages straight splines 19 formed on the coupling member 10, to permit relative axial movement therebetween. The coupling member 11 is of cup-shaped configuration and disposed between the bottom wall thereof and an internal shoulder of the hollow screw shaft are a pair of springs 20 and 21. The coupling member 11 is further provided with an axially extending annular shoulder upon which teeth 22 are formed.

The coupling member 10 is of tubular construction and is formed with a smaller diameter portion 23 and a larger diameter portion 24. The larger diameter portion 24 is provided with teeth 25, which are adapted to cooperate with the teeth 22 on the coupling member 11. The smaller diameter portion 23 of the member 10 has anchored thereto a worm wheel 26, which is adapted to mesh with a worm 27. Reference to the previously mentioned patent will disclose that the actuator is of the dual drive type, that is, movement of the piston 15 may be effected either by means of fluid under pressure or by means of an electric motor operatively connected with the worm 27. Reciprocal movement of the piston 15 adjusts the position of a clevis 28 to which the part to be adjusted is attached. The locking means comprising coupling members 10 and 11 are provided to maintain the piston 15 and the clevis 28 in the desired position during the absence of fluid pressure application to the cylinder 13, or during the absence of rotation of the worm 27 by an electric motor, not shown.

The locking means are adapted to be released by servo actuated means 29 when fluid under presure is utilized to effect movement of the piston 15. The servo actuated means include a piston 30 and a rod 31 disposed within a chamber 32 formed within the cap member 12. When fluid under pressure is applied to either side of the piston 15 disposed within the cylinder 13, pressure is simultaneously admitted to the chamber 32 whereby the piston 30 and the rod 31 will move downwardly, as viewed in the drawing, thereby compressing springs 20 and 21 and disengaging the toothed coupling members 10 and 11, in accordance with the disclosure of the aforementioned patent. When the members 10 and 11 are not in engagement, the screw shaft 14 may rotate thereby permitting the piston 15 to reciprocate. When the part to which the clevis 28 is attached has been adjusted to the desired position, fluid pressure application to the cylinder 13 is discontinued and the springs 20 and 21 effect engagement between members 10 and 11 to lock the screw shaft 14 against rotation whereby the piston 15 and clevis 28 will be maintained in their adjusted positions. When the motor, not shown, associated with worm 27 is deenergized, the coupling member 10 is rendered immovable by reason of an irreversible gear train, not shown, connected therebetween.

If the coupling members 10 and 11 are of the conventional dog toothed type having beveled teeth to facilitate engagement therebetween, experience with actuators of the type referred to has indicated that an extensive period of time may lapse after the discontinuance of fluid pressure application to the cylinder 13 before the members 10 and 11 become engaged. This is due primarily to the fact that when beveled teeth surfaces are employed, ratcheting occurs between the rotating member 11 and the stationary member 10 as the springs 20 and 21 move the member 11 axially to effect engagement of the members. This ratcheting movement has been found to continue until the torque of the rotating member 11 has been substantially reduced through sliding friction. Moreover, the use of beveled teeth in the coupling members fails to provide the positive lock which is required when the actuators are used to position control surfaces on aircraft, in that a relatively small separating force will disengage the members. In addition dog toothed coupling members having beveled teeth inherently result in undesirable back-lash occurring between the relatively movable coupling members.

Referring more particularly to Figs. 2 through 5, the novel coupling of the present invention wil now be described. As each of the members 10 and 11 are provided with identical toothed configurations, only one of them will be dealt with in detail. The coupling member 11 is provided with a plurality of radially arranged teeth of equal size projecting axially from its face and separated by a plurality of tooth receptive slots of substantially equal size, except for a small clearance to facilitate engagement. For clarity of description, the teeth of the member 11 are grouped in sets of three, 33, 34 and 35, each tooth being separated from its adjacent teeth by a slot 36. The teeth 35 project substantially twice the axial extent of teeth 34 and 35, and each of the longer teeth 35 are separated from each other by slots 36 and the shorter teeth 33 and 34. The ends of all of the teeth 35 lie in substantially the same plane, which plane is perpendicular to the axis of the member 11. Moreover, the ends of the shorter teeth 33 and 34 likewise, lie in substantially the same plane, which plane is also perpendicular to the axis of the member 11. The bottom of the slots 36 lie in a common plane which is also perpendicular to the axis of the member 11. As is apparent from the examination of the Figs. 2 through 4, all the tooth surfaces are at substantially right angles to one another, thereby precluding any camming action between the teeth of members 10 and 11 during engagement thereof whereby ratcheting movement between the two members is eliminated. Moreover, the width of the slots separating the teeth may be constructed substantially equal to the width of the teeth to minimize backlash.

The member 10 is likewise formed with sets of teeth 37, 38 and 39, grouped in threes, the teeth being separated by slots 40. Similarly teeth 39 project substantially twice the axial extent of teeth 37 and 38. It is to be understood that the axial extent of the teeth 37 and 38 relative to the axial extent of teeth 39 is determined by the load imposed upon the coupling. In this regard the shorter teeth may be greater than one-half the length of the longer teeth, i. e. above the pitch line, to enable load engagement between each of the several teeth for loads of substantial magnitude. The toothed configuration of the members promotes positive engagement therebetween within a maximum relative arcuate movement therebetween of three teeth as will presently appear.

The operation of the coupling is as follows, assuming the members 10 and 11 to be separated, the member 10 being stationary and the member 11 being rotated. Upon axial or longitudinal movement of the rotating member 11 toward the fixed member 10, three positions of positive engagement between the two members 10 and 11 are possible, as illustrated in Figs. 2 through 4. For example, upon longitudinal movement of the rotating member 11 toward the member 10, the teeth 35 and 39 of greatest axial extent on each member may come into face engagement. Upon relative rotating movement occurring between members 10 and 11 under these conditions, accompanied by relative longitudinal movement therebetween, the long teeth 35 of the member 11 may fall into engagement with the slots 40 of the member 10 between the two short teeth 37 and 38, as illustrated in Fig. 2; similarly, the long teeth 35 of the member 11 may fall into the slot between long tooth 39 and short tooth 37 of the member 10; and finally, the long teeth 35 may fall into the slot between long teeth 39 and short teeth 38 of the member 10.

In every case, however, positive engagement between the coupling members 10 and 11 will necessarily be effected within a relative arcuate movement therebetween throughout the distance of three teeth. This result obtains by reason of the two short teeth separating the long teeth on each coupling member. For example, if the long teeth of each member should first come into engagement, slight relative arcuate movement between the two members accompanied by the longitudinal movement effected by means such as the springs 20 and 21, shown in Fig. 1, will move the long teeth into the space provided by the short teeth positioned between the long teeth. Accordingly, continued arcuate or rotative movement of the member 11 will bring the side surfaces of the long teeth in engagement within the distance of three teeth if the long teeth are not received within the slots 40 separating the short teeth in the interim.

It will now become readily apparent that the novel coupling herein described provides positive engagement between the two members within an extremely small arcuate distance. Moreover, as the tooth receptive slots of the members may be formed substantially to dimensional exactitude with the teeth, backlash normally attendant in couplings of the dog toothed type will be practically eliminated. Furthermore, the novel coupling of the present invention will operate in either of two directions to establish positive engagement between the two members. In addition, it is readily apparent that the coupling may be adapted for use either as a clutch or a brake.

While the embodiment of the present invention as herein disclosed, constitutes a preferred form, it is to be understood that other forms might be adopted.

What is claimed is as follows:

1. In an actuator of the type including, a cylinder and a reciprocable piston disposed in said cylinder capable of fluid pressure actuation in either direction, the improvement which comprises releasable locking means operatively associated with said piston for preventing movement thereof when no fluid pressure is exerted thereon, said locking means comprising a first annular member normally restrained against rotation, a second annular member operatively connected with said piston so as to rotate in response to piston reciprocation, said second annular member being supported for axial movement relative to said first annular member, and resilient means acting on said second annular member for urging it into engagement with said first annular member, said members being coaxially arranged and having coengaging faces, each member having a plurality of teeth projecting axially from its face, the ends of said teeth lying in different planes, whereby when the members are moved toward each other by said resilient means and rotated relative to each other due to piston movement, the teeth thereof will effect positive engagement of the members within a predetermined relative rotative movement therebetween so as to lock said piston against movement.

2. In an actuator of the type including, a cylinder, a reciprocable piston disposed in said cylinder capable of fluid pressure actuation in either direction, and a screw shaft rotatably supported in said cylinder and operatively connected with said piston so as to rotate in response to piston movement, the improvement which comprises, releasable locking means operatively connected with said screw shaft for preventing rotation thereof and, hence, locking said piston against movement, said locking means including a first member normally restrained against rotation, a second member of cup-shaped configuration, said second member having a straight spline connection with said screw shaft whereby said second member is constrained for rotation with said screw shaft but adapted for axial movement relative thereto, and resilient means acting on said second member for moving said second member axially into engagement with said first member, said members being coaxially arranged and having coengaging faces, each member having a plurality of teeth projecting axially from its face, the ends of said teeth lying in different planes, whereby when said second member is moved axially toward said first member by said resilient means during rotation of said second member by said screw shaft, the teeth of said members will effect positive engagement of the members within a predetermined relative rotative movement therebetween so as to lock said screw shaft and said piston against movement.

References Cited in the file of this patent

UNITED STATES PATENTS

| | | |
|---|---|---|
| 1,009,990 | Norton | Nov. 28, 1911 |
| 1,183,296 | Gramm | May 16, 1916 |
| 1,757,414 | Collins | May 6, 1930 |
| 1,977,204 | Peterson | Oct. 16, 1934 |
| 2,620,683 | Geyer | Dec. 9, 1952 |
| 2,633,218 | Pielstick | Mar. 31, 1953 |